US011280347B2

(12) United States Patent
Del Rio et al.

(10) Patent No.: US 11,280,347 B2
(45) Date of Patent: Mar. 22, 2022

(54) FAN FOR AN AIRCRAFT COOLING UNIT

(71) Applicant: SAFRAN ELECTRICAL & POWER, Blagnac (FR)

(72) Inventors: Fabien Del Rio, Blagnac (FR); Nicolas Sentenac, Blagnac (FR); Rene Salvador, Blagnac (FR); Jean-Yves Goestchel, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 16/962,758

(22) PCT Filed: Jan. 17, 2019

(86) PCT No.: PCT/EP2019/051189
§ 371 (c)(1),
(2) Date: Jul. 16, 2020

(87) PCT Pub. No.: WO2019/141790
PCT Pub. Date: Jul. 25, 2019

(65) Prior Publication Data
US 2020/0355196 A1 Nov. 12, 2020

(30) Foreign Application Priority Data
Jan. 19, 2018 (FR) ...................... 1850421

(51) Int. Cl.
*F04D 29/26* (2006.01)
*F01D 25/12* (2006.01)
*F04D 29/32* (2006.01)

(52) U.S. Cl.
CPC ........... *F04D 29/263* (2013.01); *F01D 25/12* (2013.01); *F04D 29/329* (2013.01);
(Continued)

(58) Field of Classification Search
CPC ........ F04D 29/20; F04D 29/26; F04D 29/263; F04D 29/32; F04D 29/325; F04D 29/329;
(Continued)

(56) References Cited

U.S. PATENT DOCUMENTS 2,441,432 A * 5/1948 McGee ................. F04D 29/266
416/188
5,129,795 A * 7/1992 Hyland ..................... F04D 7/06
415/115
(Continued)

FOREIGN PATENT DOCUMENTS

| FR | 3029996 A1 | 6/2016 |
| JP | 07-103193 A | 4/1995 |
| WO | 2017/046490 A1 | 3/2017 |

OTHER PUBLICATIONS

FR3029996A1_Machine_Translation (Vergez, S.) Jun. 17, 2016. [online] [retrieved on Aug. 13, 2021] Retrieved from: Espacenet (Year: 2016).*
(Continued)

*Primary Examiner* — Woody A Lee, Jr.
*Assistant Examiner* — Elton K Wong
(74) *Attorney, Agent, or Firm* — Womble Bond Dickinson (US) LLP

(57) ABSTRACT

Fan (16), in particular for an aircraft cooling unit, having a wheel (128) comprising a hub (138) and an annular array of blades (140), a shaft assembly (136) for driving the wheel about an axis (A), and fusible means for connecting the hub of the wheel to the shaft assembly, said fusible connecting means comprising a first mounting sleeve through which the shaft assembly extends and which is surrounded by the hub, and fusible safety elements (174) which extend parallel to the axis (A) and are configured to break and to disengage the wheel from the shaft assembly when said wheel rotates and a driving torque of the wheel transmitted by the shaft (Continued)

assembly exceeds a certain threshold, characterised in that the connecting means comprise a second wearing sleeve (143) which is inserted between the first sleeve and the hub and through which the fusible elements extend, the second sleeve being made of a material which is different from that of the first sleeve and subject to wear by friction and/or by heating if the shaft assembly continues to rotate following the aforementioned disengagement.

9 Claims, 3 Drawing Sheets

(52) U.S. Cl.
CPC .... *F05D 2220/323* (2013.01); *F05D 2260/20* (2013.01); *F05D 2260/311* (2013.01)

(58) Field of Classification Search
CPC ............. F05D 2260/20; F05D 2260/30; F05D 2260/31; F05D 2260/311; F05D 2220/323; F01D 25/12; F01D 21/045
See application file for complete search history.

(56) References Cited

U.S. PATENT DOCUMENTS

| | | | |
|---|---|---|---|
| 10,408,277 B2* | 9/2019 | Cladiere | F04D 29/263 |
| 2020/0116157 A1* | 4/2020 | Tanaka | F04D 29/281 |

OTHER PUBLICATIONS

International Search Report received for PCT Patent Application No. PCT/EP2019/051189, dated Mar. 15, 2019, 5 pages (2 pages of English Translation and 3 pages of Original Document).

\* cited by examiner

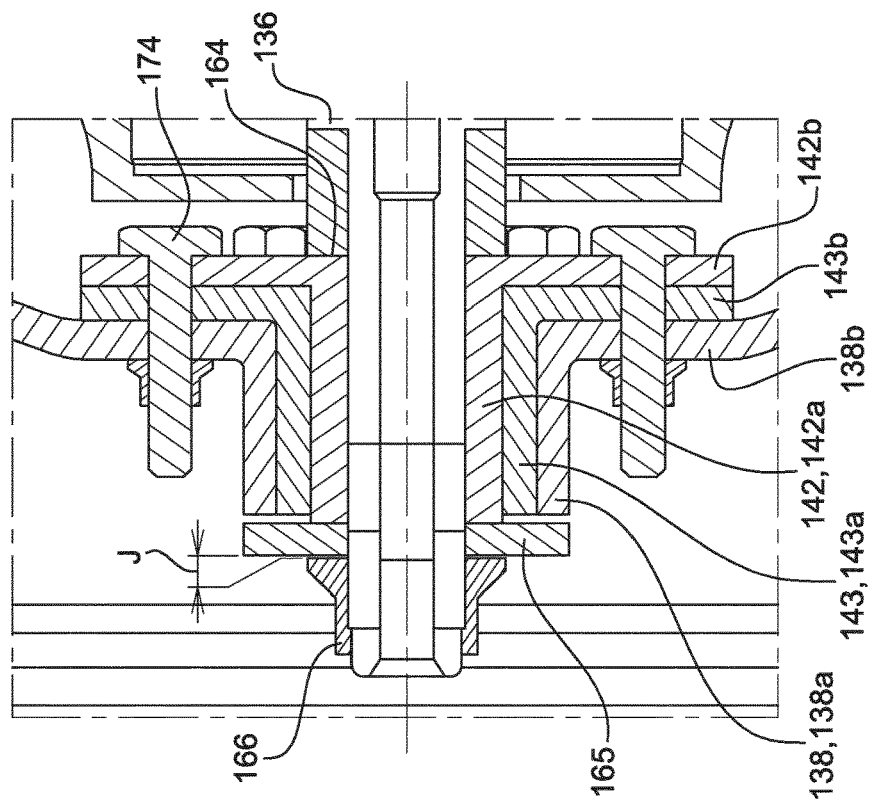
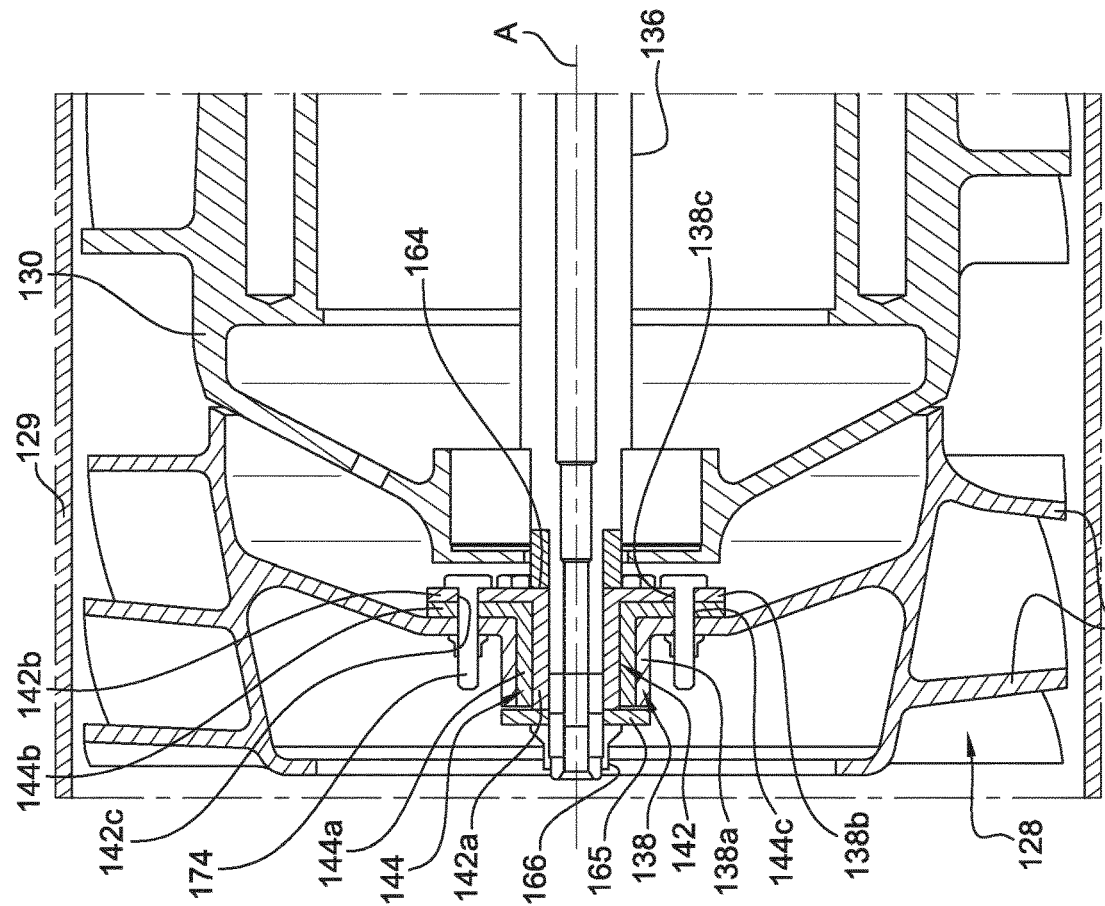

FAN FOR AN AIRCRAFT COOLING UNIT

TECHNICAL FIELD

The present invention relates in particular to a fan, especially for an aircraft cooling unit.

BACKGROUND

The background includes the document WO-A1-2017/046490.

The aircraft engines are equipped with cooling units for fluids such as oil. An oil-cooling unit of the current art comprises an air-oil exchanger and a fan which is designed to suck air through the exchanger.

The exchanger is generally of the "brick" type and the fan comprises a wheel which is arranged next to the exchanger and which sucks air through it so that the air takes the heat energy from the oil circulating in the exchanger.

The fan is a mechanical fan and its wheel is driven in rotation by a shaft assembly that is connected to an output shaft of a gearbox or to mechanical sampling means on the engine of the aircraft.

The engine manufacturers and/or helicopter manufacturers may require that, in the event of a problem with the wheel of the fan, such as a blockage of the wheel or the ingestion of a foreign object in the fan, the increase of the driving torque of the wheel beyond a certain threshold results in a controlled breakage of a part in order to uncouple or disengage in rotation the fan wheel from the output shaft of the gearbox or from the mechanical removal means on the engine.

In the current art, this safety function is provided on the drive shaft assembly of the wheel of the fan. The shaft assembly comprises a section with a fusible part intended to break if the torque transmitted to the wheel exceeds a certain threshold. This section is then called the "breakable shaft" since it is the one that is intended to break in the above-mentioned case.

In addition to this breakable shaft, the shaft assembly comprises several elements (main shaft, sheath, bearings, flange, preload washer, etc.) and is therefore relatively complex. The breakable shaft forms an intermediate part which causes an offset of the wheel with respect to the output shaft and requires the guidance of the shaft assembly by means of bearings and ancillary parts. Although this complexity is not required by the customer, it is necessary to integrate the safety function. The shaft assembly is therefore expensive and has a high mass. In addition, the presence of bearings reduces the reliability and service life of the fan.

The Applicant has already proposed a solution to this problem in the document WO-A1-2017/046490. This document describes a fan with the characteristics of the preamble to claim 1. It proposes, in particular, to provide the safety function on the fan wheel instead of on the drive shaft assembly of the wheel. The shaft assembly can thus be simplified and be less expensive and less heavy than that of the prior art. This reduces the cost of the fan but also to increase its reliability. The fan wheel therefore incorporates a fusible element enabling the wheel to be uncoupled from the shaft assembly when the torque transmitted by the shaft or the shaft assembly exceeds a predetermined threshold.

During operation, the speed of rotation of the wheel can be very high, for example in the order of 10,000 to 20,000 rpm. After the fusible element breaks, a very high temperature rise is created, causing relative movements of the parts, which can lead to their seizing or even welding, thus cancelling the desired phenomenon of disengagement of these parts.

SUMMARY OF THE INVENTION

The present invention offers a simple, effective and economical solution to this problem.

The invention provides a fan, in particular for an aircraft cooling unit, comprising:
  a wheel comprising a hub and an annular row of blades,
  a shaft assembly for driving the wheel around an axis, and
  fusible means for connecting the hub of the wheel to the shaft assembly, these fusible connecting means comprising a first fixing sleeve through which the shaft assembly passes and surrounded by said hub, and fusible safety elements which extend parallel to said axis and are configured to break and to disengage the wheel from the shaft assembly in rotation when a driving torque of the wheel transmitted by said shaft assembly exceeds a certain threshold,
  characterized in that said connecting means comprise a second wearing sleeve which is interposed between said first sleeve and said hub and through which said fusible elements pass, said second sleeve being made of a material which is different from that of the first sleeve and subject to wear by friction and/or by heating if the shaft assembly continues to rotate following the aforementioned disengagement.

The invention thus proposes to add a wearing part to the fusible connecting means, this wearing part being configured to wear out as a priority in the case where the shaft assembly would continue to rotate following a disengagement of the wheel from this shaft assembly. The wearing part is an intermediate or interposed part and therefore preferably avoids direct contact between the hub and the fixing sleeve, because it is this direct contact of parts, generally metallic parts, which generates the problem of heating of the prior art. The wearing sleeve is advantageously configured to facilitate the sliding of the hub of the wheel in relation to the fixing sleeve.

The nominal torque transmitted by the fusible element of the wheel is preferably between 1 and 15 N·m. The breaking point can be ten times the nominal torque, and is of the order of 10 to 150 N·m.

The fan according to the invention may comprise one or more of the following characteristics, taken alone or in combination with each other:
  said second sleeve comprises a cylindrical portion and a radial portion, the cylindrical portion of the second sleeve being interposed between cylindrical portions of the first sleeve and the hub, and the radial portion of the second sleeve being interposed between radial portions of the first sleeve and the hub,
  said fusible elements are screws and ensure the fixing of the wheel,
  the screws pass axially through the radial portions of the first and second sleeves and the hub,
  the screws pass through with substantially no clearance axial orifices of the radial portions of the first and second sleeves and the hub,
  said first sleeve is held clamped axially against a shoulder of the shaft assembly by a nut screwed at one end of the shaft assembly,
  said nut bears axially on a washer which itself bears axially on the cylindrical portion of the first sleeve, this washer being separated by axial clearance from the cylindrical portions of the second sleeve and of the hub, said first sleeve is made of metal and said second sleeve is made of plastic material.

The invention further relates to an aircraft cooling unit, comprising a heat exchanger, e.g. air-oil, and a fan as described above.

The invention also relates to an engine or gearbox for an aircraft, such as a helicopter, comprising an output shaft and a cooling unit as described above, the wheel of which is driven by said output shaft.

Finally, the present invention concerns an aircraft, comprising at least one cooling unit or an engine or a gearbox as described above.

DESCRIPTION OF THE FIGURES

The invention will be better understood and other details, characteristics and advantages of the invention will appear more clearly on reading the following description given as non-limiting example and with reference to the appended drawings in which:

FIG. 4 is a schematic axial cross-sectional view of a fan according to the invention, and FIG. 5 is a larger scale view of a part of FIG. 4.

DETAILED DESCRIPTION

Figure 1:
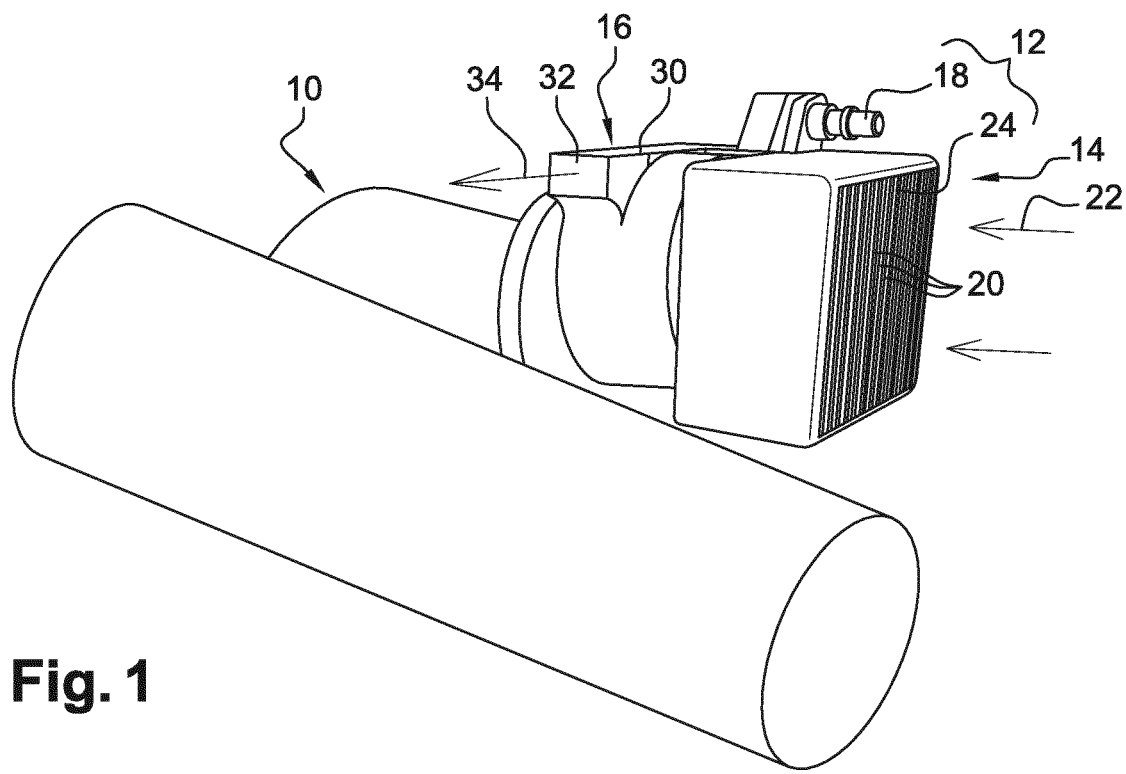
FIG. 1 is a schematic perspective view of an aircraft engine equipped with a cooling unit.
Figure 2:
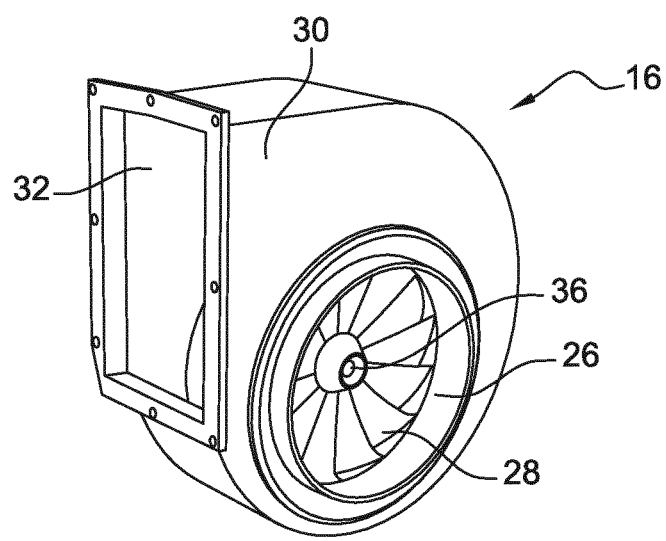
FIG. 2 is a schematic perspective view of the fan of the cooling unit in FIG. 1.

FIG. 1 shows an aircraft engine 10, here a helicopter engine, which is equipped with a cooling unit 12 for cooling the oil of the engine. The unit 12 comprises an air-oil heat exchanger 14 and a fan 16, which is best shown in FIG. 2.

The heat exchanger 14 is of the "brick" type and has a parallelepiped shape. It comprises an oil circuit connected to the oil supply and discharge ports 18, only one of which is visible in FIG. 1. It also comprises fins 20 defining heat exchange surfaces with an air flow passing through the exchanger (arrow 22). The front or inlet section 24 of the exchanger has a parallelogram shape. The outlet section (not visible) of the exchanger is also parallelogram shaped. A connecting pipe is assembled between the exchanger outlet section and the suction or inlet section 26 of the fan and provides fluid communication between these sections.

The fan 16 is here of the centrifugal type and comprises a wheel 28 which is driven by a shaft assembly 36 to force the air to be sucked through the exchanger 14 and to sweep the fins 20. The sucked air passes through the wheel and is expelled radially outwards. It is channelled through a horn 29 of the body 30 of the fan which forms a volute and extends from the above-mentioned inlet 26 to the air outlet 32 which has a substantially tangential orientation (arrow 34) with respect to a circumference centred on the axis of rotation of the wheel.

As can be seen in FIG. 1, the exchanger 14 and the fan 16 are arranged side by side. The body 30 of the fan is fixed on a casing of the engine and the exchanger 14 is usually fixed cantilevered on the fan (or directly to the engine or the gearbox).

Figure 3:
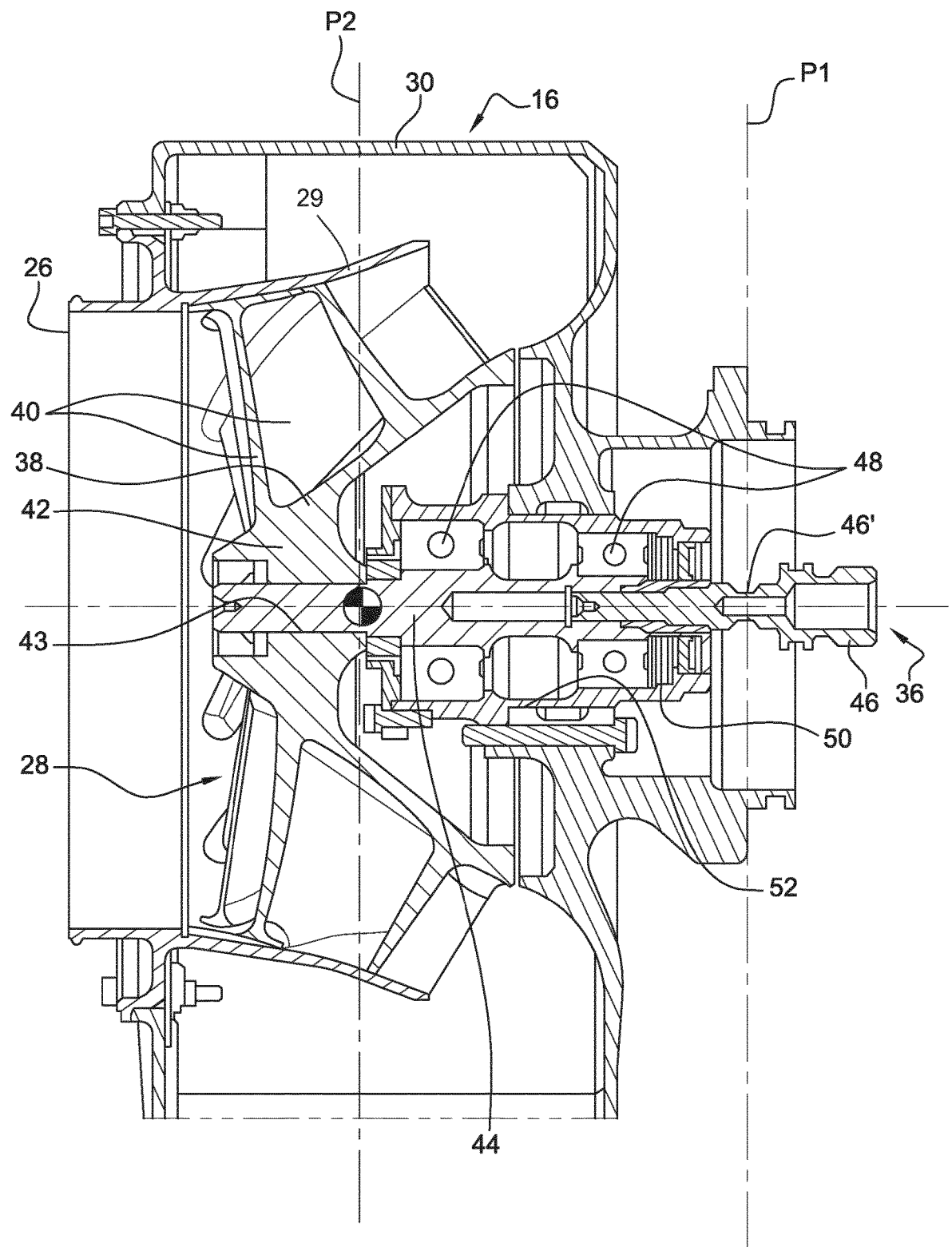
FIG. 3 is a partial schematic axial cross-sectional view of the fan of FIG. 2, and represents the prior art of the present invention.

The wheel 28 of the fan 16 and the drive shaft assembly 36 of the wheel 28 are best shown in FIG. 3.

The wheel 28 consists of a hub 38 with an annular row of blades 40 on its periphery. It also has connecting means 42 to the shaft assembly 36. These connecting means 42 are accommodated in the hub 38 and are here formed integrally with the latter. The connecting means comprise a bore 43 passing through and extending along the axis of rotation A of the wheel. The blades 40 are also formed in one piece with the hub 38. The wheel 28 is thus a single piece.

The shaft assembly 36 comprises several elements: a main shaft 44, a second shaft or shaft section called "breakable shaft" 46, bearings 48, a sheath 50, and ancillary parts such as a flange, preload washer, screws and bolts, etc.

The main shaft 44 comprises one end which passes through the bore 43 and comprises rotational coupling means which cooperate with the connecting means 42 of the wheel 28.

The opposite end of the main shaft 44 receives one end of the breakable shaft 46 which comprises a portion 46' of smaller diameter forming a fusible part of the aforesaid type. This portion 46' extends in a plane P1, radial or transverse to the axis of rotation of the wheel 28, which is remote from a parallel plane P2 passing substantially through the blades 40 of the wheel of the fan.

The main shaft 44 is centered and guided in rotation by the bearings 48 in the sheath 50 which surrounds a part of the segment 44 and the breakable shaft 46 and which is assembled in an orifice 52 of the body 30 of the fan 16.

As explained above, this technology is complex and has drawbacks due to the fact that the safety function is provided on the shaft assembly 36 through the breakable shaft 46.

The invention provides a solution by means of a fan breakable wheel which replaces the breakable shaft and simplifies the drive shaft assembly of the wheel of the fan.

FIGS. 4 and 5 represent an embodiment of the invention. These figures show a fan wheel 128 and its drive shaft assembly, which may comprise essentially a drive shaft 136.

Although the rest of the fan is not described in what follows, the characteristics of the fan described above and shown in FIGS. 1 to 3 may be referred to for an example of integration of the wheel 128.

The shaft 136 comprises at least two cylindrical portions with different diameters which are connected to each other by a cylindrical shoulder 164. The smaller diameter portion of the shaft 136 is surrounded by the wheel 128 and comprises an outer thread at its free end, onto which a nut 166 is to be screwed.

The wheel 128 comprises a hub 138 carrying an annular row of blades 140 on its periphery.

The wheel 128 is assembled on the shaft 136 by means of fusible connecting means, which comprise two sleeves: a first sleeve 142 known as a fixing sleeve and a second sleeve 143 known as a wearing sleeve.

The first sleeve 142 extends along the axis of rotation A of the wheel, the inside of the hub 138. The sleeve 142 comprises a cylindrical portion 142a and a radial portion 142b, i.e. an annular portion extending in a radial plane or perpendicular to the axis A. The sleeve 142 is assembled on the smaller diameter portion of the shaft 136 so that its cylindrical portion 142a is located on the side of the nut 166. The sleeve 142 is clamped axially against the shoulder 164 by the nut 166, with a washer 165 (here radial) being inserted axially between the nut 166 and the sleeve 142 (and more precisely between the nut 166 and the free end of the cylindrical portion of the sleeve 142).

The inner diameter of the sleeve 142 and the outer diameter of the smaller diameter portion of the shaft 136 can be chosen so that the sleeve is assembled on the shaft with a radial interference fit, i.e. without radial clearance. The axial tightening of the sleeve 142 on the shaft 136 is sufficient to transmit the torque between the shaft and the sleeve. However, it is possible to supplement this coupling with outer splines on the smaller diameter portion of the shaft 136 and additional inner splines in the cylindrical portion 142a of the sleeve 142.

The radial portion 142b of the sleeve 142 comprises an annular row of axial through orifices 142c for the passage of screws 174 simultaneously fusible and for the fixing of the sleeve 142 to the wheel 128, and thus of the wheel 128 to the shaft 136.

The second sleeve 143 extends along the axis of rotation A of the wheel, around the sleeve 142 and inside the hub 138. The sleeve 143 comprises a cylindrical portion 143a and a radial portion 143b. The sleeve 143 is assembled on the sleeve 142 so that its cylindrical portion 143a is located on the side of the nut 166. The portions 143a, 143b of the sleeve 143 are therefore applied respectively radially and axially to the portions 142a, 142b of the sleeve 142.

The radial portion 143b of the sleeve 143 comprises an annular row of axial through orifices 143c aligned with the through orifices 142c for the passage of screws 174. The sleeve 143, and more particularly its radial portion 143b, is clamped axially against the sleeve, and more particularly its radial portion 142b, by the fixing screws 174.

The inner diameter of the portion 143a of the sleeve 143 and the outer diameter of the portion 142a of the sleeve 142 can be selected so that the sleeve 143 is mounted on the sleeve 142 with a radial interference fit, i.e. without radial clearance.

The hub 138 of the wheel comprises a cylindrical portion 138a and a radial portion 138b, the cylindrical portion 138a being located on the side of the nut 166.

The wheel 138 is assembled around the sleeve 143 in such a way that its portions 138a, 138b are respectively radially and axially applied to the portions 143a, 143b of the sleeve 143.

The radial portion 138b of the wheel 138 comprises an annular row of axial through orifices 138c aligned with the through orifices 142c, 143c for the passage of the screws 174. The wheel 138, and more particularly its radial portion 138b, is clamped axially against the sleeve 143, and more particularly its radial portion 143b, by the fixing screws 174.

The inner diameter of the portion 138a of the wheel and the outer diameter of the portion 143b of the sleeve 143 can be selected so that the wheel 138 is assembled on the sleeve with a radial interference fit, i.e. without radial clearance.

As can be seen more clearly in FIG. 5, the free ends of the cylindrical portions 143a, 138a of the sleeve 143 and the hub 138 are separated by an axial clearance J of the washer 165 so that the axial clamping of the hub on the sleeves is achieved only by the screws 174 (and not also by nut 166) and the wheel 128 is fixed to the shaft 136 only by these screws 174.

In the example shown, the screws 174 have their heads pressed against the radial wall 142a of the sleeve 142, and receive a nut tightened against the radial wall 138b of the hub 138. The screws are, for example, three in number and evenly distributed around the axis A.

Each screw 174 is preferably assembled without radial clearance in the orifices 142c, 143c and 138c. For this purpose, these orifices can be drilled at the same time using a drill bit, the diameter of which is equal to the diameter of the threaded part of the screw.

They are fusible screws 174, i.e. they are configured to break, and split into two parts, when subjected to shear above a certain threshold. This shear threshold and the number of screws are determined as a function of a torque threshold transmitted by the shaft beyond which screw breakage is sought. For this purpose, they may include a zone of weakness and incipient failure, for example in the form of a thinning of section, i.e. a local reduction in diameter.

When the torque transmitted by the shaft 136 is higher than the predetermined threshold, the screws 174 will break and cause the wheel 128 to disengage from the shaft 136. The sleeve 142 is held axially tightened by the nut 166 against the shoulder 164 of the shaft 136 and thus remains integral with the shaft. The shaft 136 can be rotated for a certain period of time, e.g. three hours, while the wheel can remain stationary. During this rotation, the wearing sleeve 143 can wear by friction and/or heating in order to prevent seizure or welding of the sleeve 142 and the hub 136.

If the sleeve 143 disappears at least partially, e.g. after three hours, the wheel may fall off. If the axis A is vertical, the wheel could fall onto the body 130 of the fan. If the axis A is horizontal, the wheel could fall onto the larger diameter portion of the horn 129 of the body of the fan because the radial clearance between the wheel and the horn (e.g. about 0.3 mm) is preferably less than the radial thickness of the sleeve 143. The shaft 136 could continue to rotate for three hours.

For example, the hub 138 and the blades 140 are made of aluminium and the shaft 138 is made of stainless steel. The sleeve 142 can be made of metal (e.g. stainless steel) and the sleeve is preferably made of plastic material, for example chosen from PEEK GL30 or PEEK CA30, POM-C, PA66, VESPEL®, ULTEM®, etc.

In order to guarantee the alignment between the wheel 128 and the sleeves 142, 143, the assembly and fixing by means of screws 174 can be carried out after a first step of roughing the wheel, and before a step of machining the wheel.

In an alternative embodiment not shown, the screws 174 could be replaced by rivets, also fusible.

The invention claimed is:

1. A fan, for an aircraft cooling unit, comprising:
a wheel comprising a hub and an annular row of blades,
a shaft assembly for driving the wheel around an axis, and
fusible means for connecting the hub of the wheel to the shaft assembly, said fusible means for connecting comprising a first fixing sleeve through which the shaft assembly passes and surrounded by said hub, and fusible safety elements which extend parallel to said axis and are configured to break and to disengage the wheel from the shaft assembly in rotation when a driving torque of the wheel transmitted by said shaft assembly exceeds a certain threshold,
wherein said fusible means for connecting comprise a second wearing sleeve which is interposed between said first fixing sleeve and said hub and through which said fusible safety elements pass, said second wearing sleeve being made of a material which is different from that of the first fixing sleeve and subject to wear by friction and by heating if the shaft assembly continues to rotate following the aforementioned disengagement.

2. The fan according to claim 1, wherein said second wearing sleeve comprises a cylindrical portion and a radial portion, the cylindrical portion of the second wearing sleeve being interposed between cylindrical portions of the first fixing sleeve and the hub, and the radial portion of the second wearing sleeve being interposed between radial portions of the first fixing sleeve and the hub.

3. The fan according to claim 2, wherein said fusible safety elements are screws and ensure the fixing of the wheel, and the screws axially pass through the radial portions of the first fixing sleeve and second wearing sleeve and the hub.

4. The fan according to claim 3, wherein the screws pass through with no clearance axial orifices of the radial portions of the first fixing sleeve, the second wearing sleeve and the hub.

5. The fan according to claim 1, wherein said fusible safety elements are screws and ensure the fixing of the wheel.

6. The fan according to claim 1, wherein said first fixing sleeve is held clamped axially against a shoulder of the shaft assembly by a nut screwed on one end of the shaft assembly.

7. The fan according to claim 6, wherein said nut bears axially on a washer which itself bears axially on a cylindrical portion of the first fixing sleeve, this washer being separated by an axial clearance from cylindrical portions of the second wearing sleeve and of the hub.

8. The fan according to claim 1, wherein said first fixing sleeve is made of metal and said second wearing sleeve is made of plastic material.

9. An aircraft cooling unit, comprising a heat exchanger and a fan according to claim 1.

\* \* \* \* \*